No. 690,935. Patented Jan. 14, 1902.
A. DUCASBLE.
PNEUMATIC TIRE.
(Application filed Feb. 28, 1901.)
(No Model.)

WITNESSES:
INVENTOR:

UNITED STATES PATENT OFFICE.

ALFRED DUCASBLE, OF PARIS, FRANCE.

PNEUMATIC TIRE.

SPECIFICATION forming part of Letters Patent No. 690,935, dated January 14, 1902.

Application filed February 28, 1901. Serial No. 49,199. (No model.)

*To all whom it may concern:*

Be it known that I, ALFRED DUCASBLE, a citizen of the Republic of France, residing at Paris, France, have invented certain new and useful Improvements in Self-Inflating Pneumatic Tires, of which the following is a specification.

My invention relates to a self-inflating pneumatic tire; and it consists mainly of a curved cylindrical body closed at the ends and provided throughout its length with a series of chambers communicating with each other by small passages, the first of the series of chambers having an opening for the admission of air, which is preferably provided with a curved tube having a flaring mouth in the form of a trumpet to catch the air as the tire is rapidly revolved by frictional contact with the ground.

Other minor details of construction embodying my invention will be more fully understood by reference to the accompanying drawings, in which—

Figure 1:
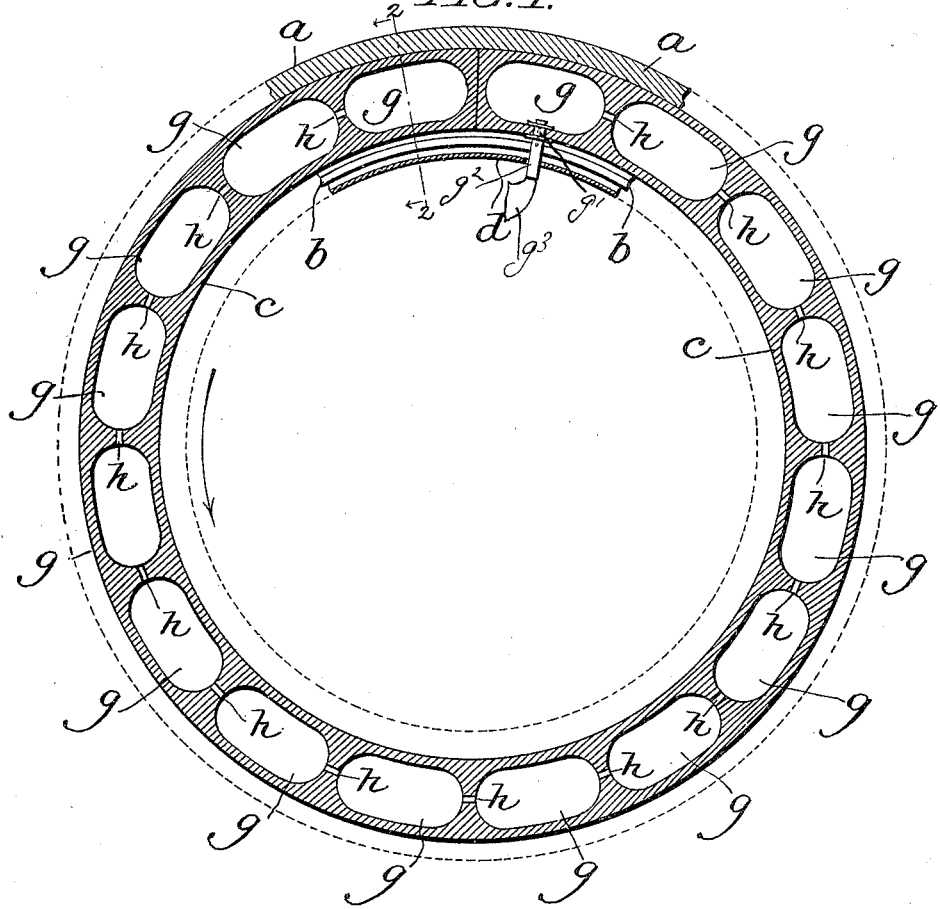
Figure 2:
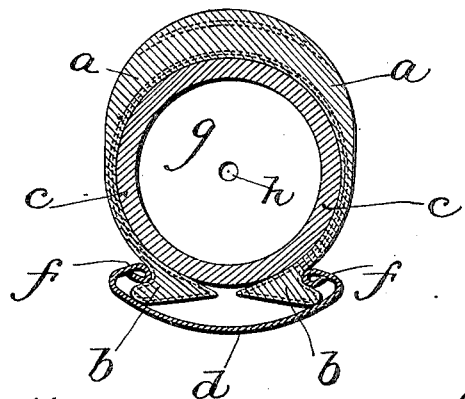

Figure 1 represents a vertical section of the tire with the greater portion of the outer covering and rim of the wheel broken away. Fig. 2 illustrates an enlarged transverse section on the line 2 2 of Fig. 1.

Referring to the letters of reference, $c$ represents a cylindrical body, of rubber or other elastic material, which is bent around in the form of a circle and provided throughout its length with a series of chambers $g$ $g$, &c., curved at the ends and connected by narrow passages $h$ $h$, &c. The first chamber, which is shown at the top and right-hand side of Fig. 1, is provided with an opening $g'$ for the reception of a tube $g^2$, which may, if desired, be provided with a valve to prevent the escape of air when a chamber is compressed. This tube is provided with a flaring mouthpiece $g^3$, bent so as to more readily force air into the chambers when the tire and wheel to which it may be secured are rapidly rotated in the direction of the arrow shown in Fig. 1.

The cylindrical body $c$ is inclosed in a covering $a$, which is preferably thickened at the center or tread to allow for wear and form a better protection for the inner cylinder. The sides of the covering $a$, which is a continuous ring, have tapering enlargements $b$ $b$, slightly undercut to receive the inwardly-bent sides $f f$ of the metal ring $d$.

In the tire above described there is no occasion for the use of a pump or other artificial means of inflation. Air enters the first chamber through the tube $g^2$, and this chamber is compressed by its outer surface coming in contact with the ground. As the tire revolves a portion of the air contained therein is compressed, due to the closing of the passages $h$ $h$, the curvature of the walls of the chambers and consequent thickening of the tire at points adjacent to the passages $h$ being sufficient to extend the walls and inflate the tire after the pressure has been relieved. Should the pressure accumulate slightly above the pressure required to form a good air-cushion in the chambers, then the passage $h$ will be slightly opened by the excess pressure and the air will escape backward toward the chamber containing the tube $g^2$. As before stated, the tube $g^2$ may, if desired, contain a check or clack valve to prevent the escape of air once admitted; but in practice it has been found that such valves are unnecessary, and better results are obtained where fresh air is allowed to freely circulate in the compartments or chambers.

Having described my invention, what I claim, and desire to secure by Letters Patent, is—

1. A tire for vehicles consisting of a cylindrical body of rubber or other elastic material, closed at its ends and provided throughout its length with a series of chambers, each of which except the last is connected by small air-passages, the first chamber of the series having an opening for the ingress of air.

2. A tire for vehicles, comprising a cylindrical body of rubber or other flexible material, provided throughout its length with a series of chambers having curved walls, each of which except the first and last is connected together in a circular series by small passages, the first of the series being provided with a bent tube having a flaring mouth for the admission of air.

3. A tire for vehicles, consisting of a cylindrical body of rubber or other elastic material, closed at the ends and provided throughout its length with a series of chambers curved at the ends and connected by small passages, the first chamber of the series being provided with an opening for the admission of air.

4. A tire for vehicles, consisting of a cylindrical body of rubber or other elastic material, closed at its ends, and provided throughout its length with a series of elliptical chambers connected by air-passages, one of said chambers having an opening communicating with the atmosphere.

5. A tire for vehicles, consisting of a cylindrical body of rubber closed at its ends, and bent in the form of a circle and provided with a series of ovoid chambers communicating by small openings or passages one of said chambers being open to the atmosphere, and a curved flaring tube or trumpet communicating with said opening.

6. A tire for vehicles, consisting of a cylindrical tube of rubber closed at its ends and divided into a number of communicating chambers having curved walls united at the thickened ends by contracted openings, one of the chambers having an opening for the ingress of air.

In testimony whereof I affix my signature in presence of two witnesses.

ALFRED DUCASBLE.

Witnesses:
CHARLES WILLIAM FIRNHABER,
EDWARD P. MACLEAN.